(12) United States Patent
Bolz

(10) Patent No.: US 7,502,353 B2
(45) Date of Patent: Mar. 10, 2009

(54) DEVICE FOR ACCESSING A VEHICLE CONTROL SYSTEM VIA A WIRELESS LINK

(75) Inventor: Peter Bolz, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 538 days.

(21) Appl. No.: 10/521,673

(22) PCT Filed: Jun. 10, 2003

(86) PCT No.: PCT/DE03/01905

§ 371 (c)(1),
(2), (4) Date: Jan. 18, 2005

(87) PCT Pub. No.: WO2004/019209

PCT Pub. Date: Mar. 4, 2004

(65) Prior Publication Data

US 2005/0243779 A1 Nov. 3, 2005

(30) Foreign Application Priority Data

Aug. 17, 2002 (DE) ................................. 102 37 715

(51) Int. Cl.
*H04Q 7/24* (2006.01)
*H04L 12/66* (2006.01)
*G06F 17/00* (2006.01)

(52) U.S. Cl. ...................... 370/338; 370/401; 307/10.1; 701/2

(58) Field of Classification Search ................. 370/338, 370/401; 307/10.1; 701/2
See application file for complete search history.

(56) References Cited

U.S. PATENT DOCUMENTS

| | | | |
|---|---|---|---|
| 5,732,074 A | 3/1998 | Spaur et al. | |
| 6,023,232 A * | 2/2000 | Eitzenberger | 340/988 |
| 6,275,585 B1 * | 8/2001 | Ablay et al. | 380/2 |
| 6,430,164 B1 * | 8/2002 | Jones et al. | 370/313 |
| 6,496,575 B1 * | 12/2002 | Vasell et al. | 379/102.05 |
| 6,604,024 B2 * | 8/2003 | Braun et al. | 701/1 |
| 6,622,070 B1 * | 9/2003 | Wacker et al. | 701/29 |
| 6,681,275 B2 * | 1/2004 | Connor et al. | 710/58 |
| 6,763,226 B1 * | 7/2004 | McZeal, Jr. | 455/90.2 |
| 6,765,497 B2 * | 7/2004 | Ablay et al. | 340/905 |
| 6,779,054 B2 * | 8/2004 | Campbell et al. | 710/48 |
| 6,801,942 B1 * | 10/2004 | Dietrich et al. | 709/225 |
| 7,127,386 B2 * | 10/2006 | Mocek et al. | 703/23 |
| 7,257,472 B2 * | 8/2007 | Hauer et al. | 701/29 |
| 7,275,027 B2 * | 9/2007 | Sproule et al. | 703/22 |

(Continued)

FOREIGN PATENT DOCUMENTS

DE     100 26 754     12/2001

(Continued)

OTHER PUBLICATIONS

Dynamic Deployment of Java Applications; The Embedded System Show, Online—May 24, 2000, XP002245738.

*Primary Examiner*—Alpus H Hsu
(74) *Attorney, Agent, or Firm*—Kenyon & Kenyon LLP

(57) ABSTRACT

A device for accessing a vehicle control system via a wireless link, a gateway control unit which is connected to at least one vehicle bus and to a wireless network being provided, and the gateway control unit being freely configurable via the wireless link.

9 Claims, 2 Drawing Sheets

U.S. PATENT DOCUMENTS

| | | | |
|---|---|---|---|
| 7,363,149 B2 * | 4/2008 | Klausner et al. | 701/207 |
| 7,389,319 B2 * | 6/2008 | Barr et al. | 709/203 |
| 2002/0027504 A1 * | 3/2002 | Davis et al. | 340/540 |
| 2003/0147534 A1 * | 8/2003 | Ablay et al. | 380/270 |

FOREIGN PATENT DOCUMENTS

| | | |
|---|---|---|
| EP | 1128265 | 8/2001 |
| JP | 2001 0045181 | 2/2001 |
| WO | WO 01/77620 | 10/2001 |

* cited by examiner

DEVICE FOR ACCESSING A VEHICLE CONTROL SYSTEM VIA A WIRELESS LINK

BACKGROUND INFORMATION

German Patent Application No. DE 100 26 754 describes a method and a device for transmitting (sending and/or receiving) information in connection with a vehicle. Data exchange takes place via a telecommunication network and/or a data network for performing remote service, remote diagnosis, and/or remote control of a motor vehicle, one of its components and/or functions. In this known approach, a telecommunication transmitter is provided, which is used as an interface between a wireless link and a vehicle network. However, no detailed information is provided about the design and configuration of the telecommunication transmitter.

SUMMARY OF THE INVENTION

A gateway control unit, which assumes the wireless link and thus represents an interface of the motor vehicle to the outside and which is designed to be freely configurable via the wireless link, considerably enhances the flexibility in remote access to vehicles via wireless links such as radio links, etc. It is particularly advantageous that a subsequent reconfiguration of the system, for example, replacement of protocols or change in the response of protocols or sequence controls is considerably simplified, because this reconfiguration is performed via the wireless link. This is also true for later expansions of the system, such as function expansions (new services), new protocols, increased security via integrity checks, authentications, and/or encryptions, because configurability of the gateway control unit via the wireless link is also advantageous in this case.

It is particularly advantageous that the gateway control unit may be installed in the vehicle in such a way that it includes basic equipment or does not include application equipment, and new functions or modified functions may be added later without the control unit having to be replaced or removed. Therefore, free configurability of the control unit also results in advantages when replacing or exchanging functionalities and/or partial functionalities and/or data sets as well as activating them remotely.

A particularly advantageous embodiment of a gateway control unit includes a connection to control units of the vehicle via one or more vehicle buses and another connection to at least one external infrastructure and also includes a non-volatile buffer memory and operating software, which permits the software to be extended even during operation. One example of such operating software is the known Java Virtual Machine (JVM).

It is particularly advantageous that all possible applications such a protocols, sequence controls, buffer memory functions, etc., which are needed for remote access to the motor vehicle, are no longer part of the gateway control unit software itself, but are standalone applications running on the gateway control unit software platform. These applications are therefore loadable, startable, and/or exchangeable independently of one another.

DETAILED DESCRIPTION

Figure 1:
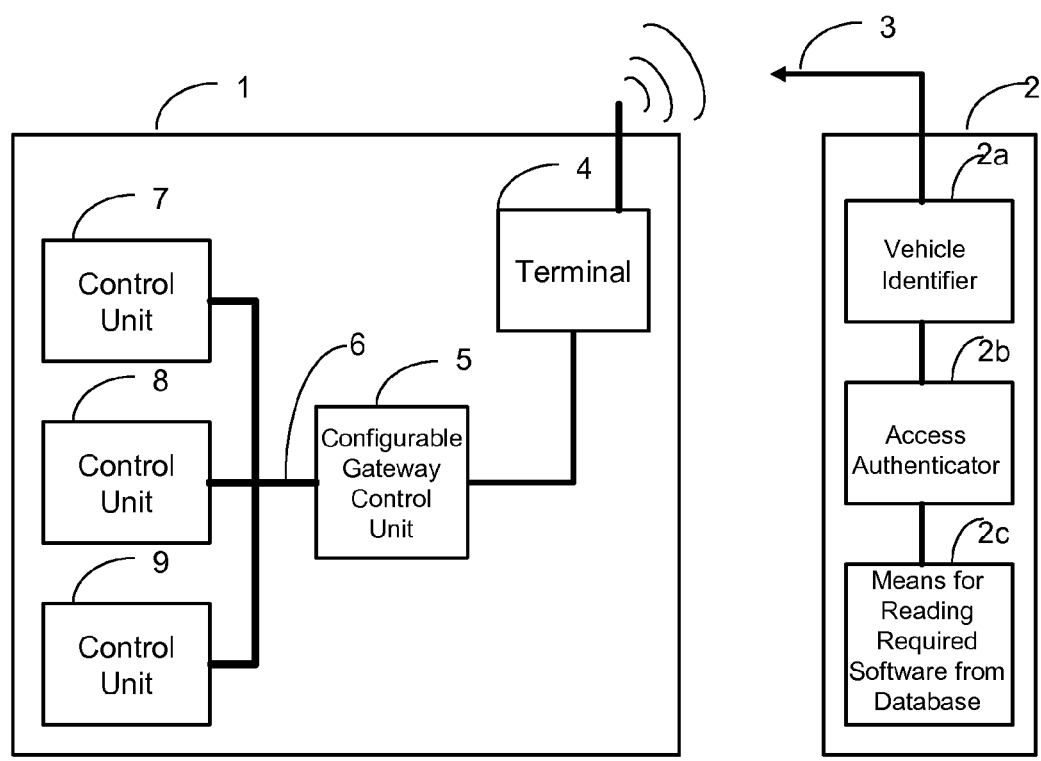
FIG. 1 shows a remotely configurable gateway control unit within a system for implementing wireless remote access to a motor vehicle.

FIG. 1 shows a system for remote access to motor vehicle components and/or motor vehicle functions. Reference symbol 1 denotes the vehicle-side part, 2 denotes the server-side or provider-side part, and 3 denotes the wireless interface between the vehicle-side and the server-side parts. Server-side part 2 represents an external infrastructure, which may include service providers, call centers, and databases. Programs, vehicle data, etc., which are transmitted at least in part to the vehicle-side part via the wireless interface, are stored in the database. Any known standard, for example GSM, may be used as the wireless standard for transmission. A terminal 4, which provides the link to wireless interface 3 and, depending on the wireless standard, may be a GSM modem, a GPRS modem, or a UMTS wireless modem, for example, is shown in the vehicle-side part. This terminal 4 is connected to configurable gateway control unit 5, which is in turn connected to a plurality of control units 7, 8, and 9 of the motor vehicle via a vehicle bus 6, for example, a Controller Area Network (CAN) bus.

Such a configuration is used in connection with functions for remote action, remote diagnosis, remote service, software download, etc. Remote action or remote query is essentially understood to be the remote control of vehicle functions, in particular of comfort functions such as turning on the parking heater, etc., as well as the query of vehicle statistics and/or operating parameters. Software download or remote flashing is used for installing a new program code or new parameters on software-configurable systems in the vehicle, for example, control units, to enhance the functionalities of these control units and their performance. Remote service essentially represents monitoring of the vehicle condition and accessing of service data in the vehicle from a central location to verify whether, when, and/or which measures are to be taken to ensure the desired condition. In general, these functionalities are summarized here under the vehicle access concept.

It is important for gateway control unit 5 itself to be freely configurable, so that it is possible to enter, activate, and/or replace access protocols for access by the gateway control unit to the control units connected to the vehicle bus via a wireless link. Depending on the connection, these loadable protocols are used for control unit diagnosis (for example, to read error memories), manipulation in and/or via control units, such as activation of actuators or direct input of sensor data (remote action), status determination of the vehicle (such as mileage, tank contents, position), and/or for software download into other control units. The latter includes both parameter sets and the application software for control units. Downloading is performed with the objective of permanently changing the response of the respective control unit.

For at least one of the above-mentioned purposes, gateway control unit 5 includes the following components: in addition to a microcomputer, at least one module is provided for wireless link, in the preferred exemplary embodiment a GSM module, a GPRS module, or a UMTS module, which is connected to the microcomputer of the control unit and delivers data transmitted by said control unit to the wireless network and/or supplies data received from the wireless network to the microcomputer.

Another component is at least one component which permits the microcomputer of the control unit to be connected to the vehicle bus. In the preferred embodiments, the vehicle bus is a CAN bus, so that CAN controller modules and driver modules are provided. These may also be part of the microcomputer of the gateway control unit. In addition, an operating system is provided, which makes it possible to expand the software in the microcomputer of the gateway control unit during operation. A Java Virtual Machine (JVM) has proven to be suitable for this purpose. Other operating systems which support dynamic addition of programs, for example, VX Works or Linux, are also applicable.

This design of the gateway control unit permits it to be freely configurable remotely via a wireless link. This means that the gateway control unit may be installed in the vehicle and subsequently receive new functions or, optionally, even the actual function, via appropriate transmission of the required software over the wireless link. Protocols, sequence controls, buffer memory functions, etc., needed for diagnosis, remote action, status query, and/or reprogramming of individual control units in the motor vehicle are no longer part of the gateway software itself, but are standalone applications which run on the above-described gateway software platform. These applications are therefore loadable, startable, and/or exchangeable independently of one another. In the preferred exemplary embodiment, the software platform on which these applications, which are independent of the actual gateway software, run is a Java Virtual Machine.

Thus, as a result of an appropriate server-side input by a user or an external user request, e.g., outside of the motor vehicle, according to an automatic sequence control during which, for example, the vehicle is identified, by a vehicle identifier 2a, access is authenticated by an access authenticator 2b, etc., the required software is read from database 2c and transmitted to the vehicle via the wireless link of server-side part 2. There the transmitted data is written permanently or temporarily into the memory of gateway control unit 5, via wireless interface 3 located there, installed in the software environment of the operating system, and possibly executed after activation by the server. During execution of the loaded software, gateway control unit 5 then establishes connection to the vehicle control units and performs the function implemented by the software. From the point of view of the other control units on the vehicle bus, in the case of reading from an error memory, the gateway control unit assumes the role of a test device. This means that, if present, the gateway control unit switches the control unit(s) involved to a test mode and performs the provided actions in this test mode, for example, reading of an error memory, loading of one or more software programs, etc.

From the point of view of an operator outside the vehicle, logged in via the wireless link, the gateway control unit exhibits the following functions, depending on the application. In the event of a diagnosis access to the control units of the vehicle, the gateway control unit is used as a test substitute and as a buffer memory, i.e., data collector. An additional control logic, which controls the data exchange in the vehicle-side part due to the tight time limits prevailing there, may be useful here. In the event of status queries, the configurable gateway control unit is used as a buffer memory, i.e., data collector, the data being collected by the corresponding control units of the vehicle via the vehicle bus using the loaded software in the gateway control unit. In performing a remote action, for example, activation of an actuator, the gateway control unit is used as a connecting gateway. The corresponding command and the required software programs (if not yet present in the gateway) are loaded into the gateway control system via the wireless link and are relayed from there to the corresponding control unit which then performs the desired action, possibly after conversion of the command into a vehicle-specific format. In the event of a software download, the gateway control unit initially represents a buffer memory for the control unit software to be installed. Therefore, the program or program part to be installed is loaded by the server into the memory of the gateway via the wireless link. In addition, sequence software (protocol), which includes the actual installation procedure, the pertinent diagnosis sequences, and the corresponding commands for the actual installation and reprogramming procedure for the corresponding control unit, is loaded into the gateway if not already present in the gateway. The gateway control unit is therefore an independent coordinator for the installation and reprogramming procedure. Also in this case, as in remote action, an extra control logic which checks and controls the reliability of the data exchange in the vehicle and/or between vehicle and server may be useful.

As mentioned previously, the gateway control unit includes components which provide the connection to at least one vehicle control unit via at least one vehicle bus. Depending on the configuration of the vehicle network, such vehicle buses may be, for example, a CAN bus, a K line, and/or a Media Oriented System Transport (MOST) bus, etc. In addition, a connection is provided via which the gateway control unit is connected to a data communication terminal, for example, a wireless modem for a wireless network. This wireless modem is connected to the gateway control unit either directly or indirectly, for example, via a vehicle bus. Depending on the configuration, this vehicle bus may be one of the above-mentioned buses. The gateway control unit also has, in addition to a computer unit, a non-volatile buffer memory, which is provided either as an additional component or as part of the microcomputer. This buffer memory is used for storing the control unit software or parameter files to be installed, the diagnosis results of the error memory of vehicle control units, as well as status information. Furthermore, protocols and sequence controls for addressing at least one control unit via the vehicle bus or for directly addressing control units not connected to the gateway control unit via the bus are stored in the buffer memory. Furthermore, the gateway control unit includes operating software, preferably a Java Virtual Machine, which allows software to be added during operation and on which Java applications independent of the actual gateway control unit software run. These applications use the libraries of the Java Virtual Machine, which are stored in the gateway control unit, possible access to the vehicle bus driver, access to the file system of the gateway control unit for temporary storage of the download software, etc. The software to be loaded is written in Java or is Java-compatible.

Figure 2:
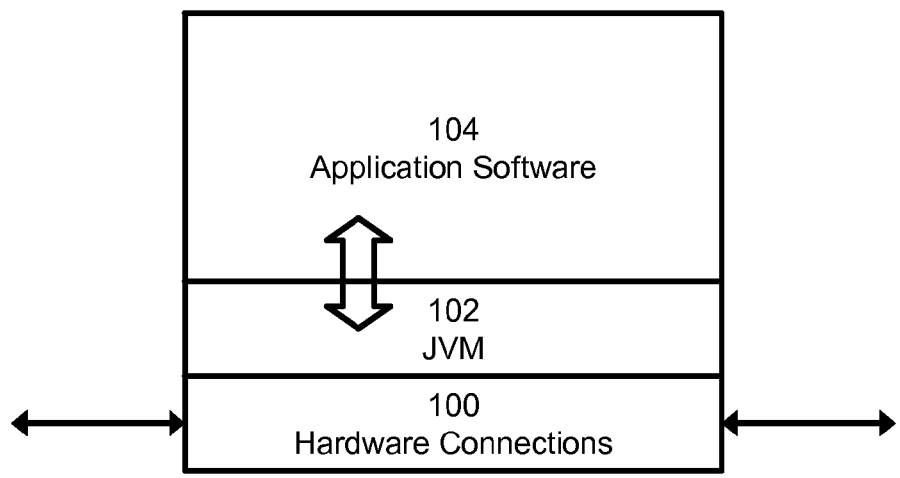
FIG. 2 shows an illustration of the gateway control unit as a layered model.

FIG. 2 shows the gateway control unit in the form of a simplified layered model for further elucidation. In the lowest level 100 is the hardware having hardware connections to the vehicle bus and to the wireless link. A Java Virtual Machine (JVM), which is essentially known by those skilled in the art, is in a second level 102, above level 100, as an operating system. The JVM may in turn itself be part of an operating system which provides services, such as wireless link, timing, or memory access, which can also be accessed by the JVM. Located in third, uppermost level 104, is the application software, which is input via the wireless link, and, depending on the application, is connected to the operating system (symbolized by the double arrow) and controls the desired function, in particular the data traffic through the gateway.

Figure 3:
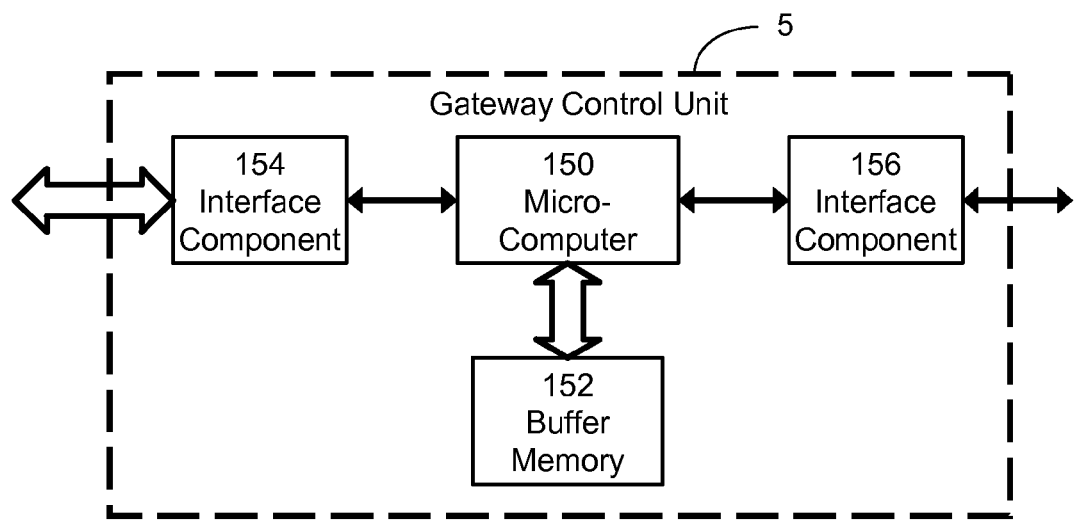
FIG. 3 shows a simplified diagram of the gateway unit in a preferred embodiment.

FIG. 3 shows a gateway control unit as a simplified block diagram. Microcomputer 150 is connected to buffer memory 152 via a data link, the software input via the wireless link and/or the information read from the vehicle system being stored in this buffer memory. Furthermore, the microcomputer is connected via further data links to an interface component 154 (e.g., CAN controller and/or CAN driver), which provides the connection to the vehicle bus. A third data link connects the microcomputer to another interface component 156, which represents the connection to the wireless network, in particular to the data communication unit or a modem. The data links may also be combined in one bus.

The gateway unit may be a separate control unit or a unit incorporated in another control unit.

What is claimed is:

1. A device for accessing a vehicle control system via a wireless link, comprising:
a gateway unit mounted in a vehicle which is connected on one side to at least one control unit in the vehicle and includes a link to at least one wireless network on the other side, the gateway unit being constructed so that it is freely configurable remotely via the wireless link, wherein the at least one control unit is connected to the gateway unit via at least one vehicle bus and the gateway unit further includes at least one microcomputer, which is equipped with a software platform permitting an expansion of software during operation.

2. The device according to claim 1, wherein the software platform is a Java Virtual Machine.

3. The device according to claim 1, wherein software is loadable into the microcomputer of the gateway unit via the wireless network, at least one of: (a) error memories being readable by control units connected to the gateway unit, (b) status information of the motor vehicle being retrievable, (c) software being loadable into other control units, and (d) at least one actuator of the motor vehicle being controllable with the help of the software.

4. The device according to claim 1, wherein the gateway unit further includes a non-volatile buffer memory and components which provide communication of the gateway unit with a vehicle control unit via the at least one vehicle bus.

5. The device according to claim 4, wherein the at least one vehicle bus is one of a Controller Area Network (CAN) bus, a Media Oriented System Transport (MOST) bus, and a K line.

6. The device according to claim 4, wherein the non-volatile buffer memory stores at least one of:(a) results of remote queries and (b) at least one of protocols and sequence controls for at least one of addressing and reprogramming other control units via the vehicle bus.

7. The device according to claim 6, wherein the results of remote queries include at least one of error codes and status information.

8. The device according to claim 1, wherein the gateway unit is further connected to a wireless modem for connection to a wireless network.

9. The device according to claim 8, wherein the connection is implemented one of (a) directly and (b) via a bus.

* * * * *